(12) United States Patent
Richiusa

(10) Patent No.: US 6,738,751 B1
(45) Date of Patent: May 18, 2004

(54) CREDIT CARD RENTAL-COST PAYMENT METHOD

(76) Inventor: Joseph S. Richiusa, 6130 W. 79th St., Burbank, IL (US) 60459

( * ) Notice: Subject to any disclaimer, the term of this patent is extended or adjusted under 35 U.S.C. 154(b) by 0 days.

(21) Appl. No.: 09/409,310

(22) Filed: Sep. 29, 1999

(51) Int. Cl.[7] .............................................. G06F 17/60
(52) U.S. Cl. ............................ 705/38; 705/33; 705/40
(58) Field of Search ....................... 705/4, 38, 33–37, 705/39, 40

(56) References Cited

U.S. PATENT DOCUMENTS

| | | | |
|---|---|---|---|
| 5,583,918 A | * 12/1996 | Nakagawa | 705/38 X |
| 6,023,687 A | * 2/2000 | Weatherly et al. | 705/38 |
| 6,208,978 B1 | * 3/2001 | Walker et al. | 705/38 |
| 6,334,107 B1 | * 12/2001 | Gale et al. | 705/10 |
| 6,347,302 B1 | * 2/2002 | Joao | 705/4 |

FOREIGN PATENT DOCUMENTS

| | | | | |
|---|---|---|---|---|
| JP | 2002015130 | * | 6/2000 | 705/38 |

OTHER PUBLICATIONS

Video Store article entitled, Catapult Readying XBAND "Rental Card" for Video Retailers, v16, N 45, p. 12, Nov. 20, 1994.*

* cited by examiner

Primary Examiner—Richard Chilcot
(74) Attorney, Agent, or Firm—Cook, Alex, McFarron, Manzo, Cummings & Mehler, Ltd.

(57) ABSTRACT

A method provides for at least potential payment of rental costs by debit from a credit card. A renter's credit card program is established by a financial institution or other commercial lending establishment. A renter's credit card under that program is issued to a party who has rented or seeks to rent a real estate unit or tangible goods. Rental-transactional authorization is granted under said program to a party who has rented or seeks to rent a real estate unit or tangible goods. Optionally a security deposit or at least one increment of rent payment is transferred under a rental arrangement between these parties by debit on the renter's credit card.

10 Claims, 1 Drawing Sheet

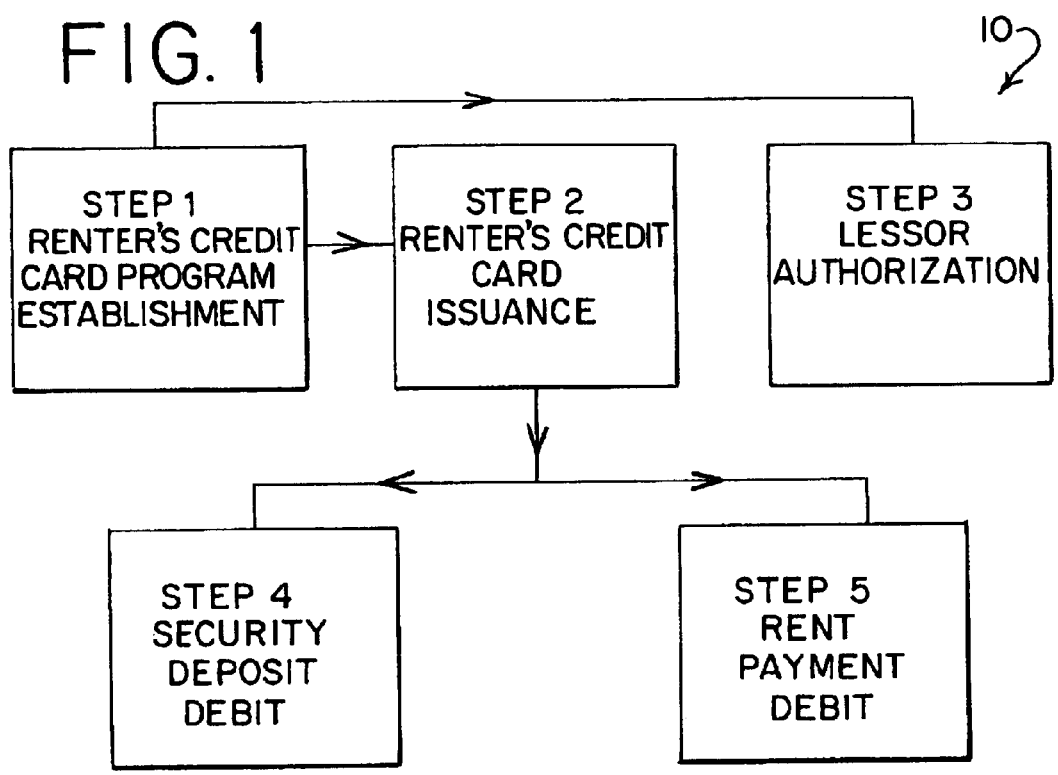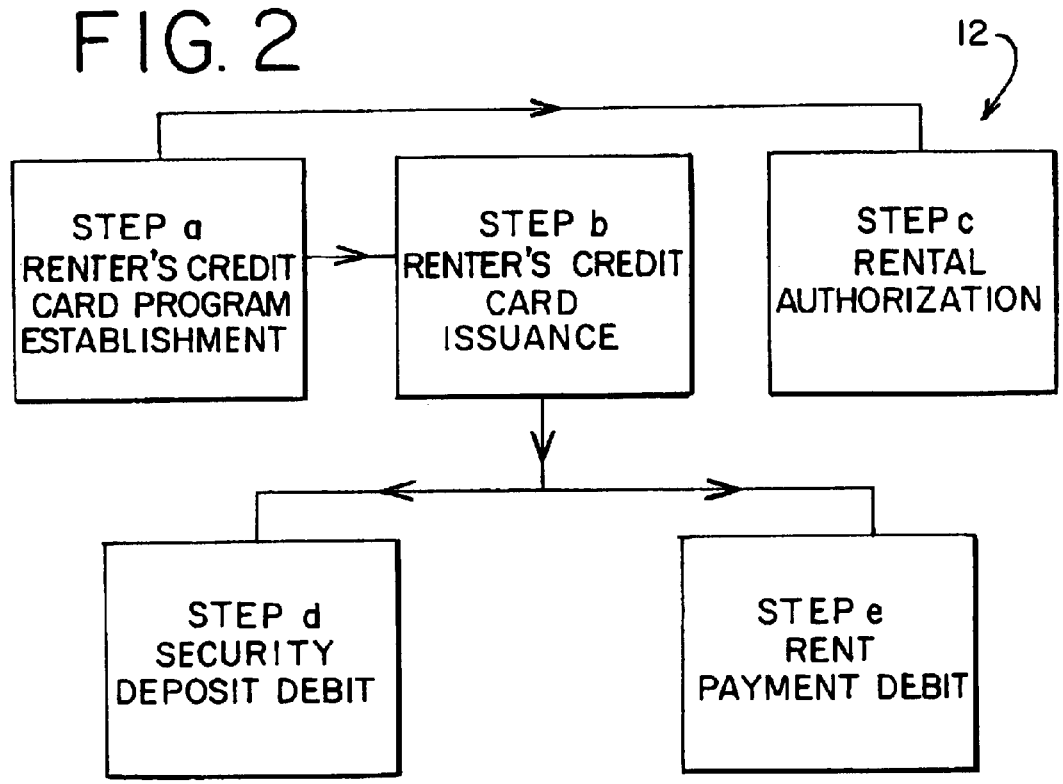

CREDIT CARD RENTAL-COST PAYMENT METHOD

BACKGROUND OF THE INVENTION

The use of credit cards for payment of the costs of retail goods and services is a well known and well entrenched commercial practice in U.S. and global economies.

Today's credit card industry is highly competitive. Financial institutions are attempting to attract new consumers with new card offerings bundled with various incentives. It is believed that the credit card industry, despite signs of saturation, is still profitable, and that instant and mobile credit provided by credit cards is a service that consumers are demanding, and will continue to demand.

A credit card is an instrument for fluid and versatile lending and borrowing. The maximum amount that can be borrowed on a credit card is generally set at the time the card is issued, and thereafter the purposes and the increments of the loans are limited only as to the retailers or merchants who are willing and authorized to accept the card. There is generally no other lender's oversight as to the use made of the funds borrowed through the use of a credit card. Neither the credit card issuer nor the merchant adjudges the value or wisdom of the consumers' purchases.

The freedom of borrowing drives consumer demand for credit card usage. In addition, many other factors drive that consumer demand, including without limitation the freedom from carrying cash for purchases and the freedom from maintaining high balances in accounts accessible by checks or the like, for instance checking accounts, which often pay no interest on balances maintained. Further, using a credit card is now routinely more convenient than paying with a personal check because check-approval delays are routinely encountered in many stores.

Any merchant with an appropriate merchant's account for a certain type of card can process sales by accepting the card. The merchant is essentially assured of collecting his funds in a credit card transaction when required approval measures are followed. Nowadays credit-card purchases are the typically the preferred non-cash method for retail goods and services. In earlier days, however, the drawbacks of credit card purchases, such as charges paid by the merchant for credit-card transactions and the need to maintain credit-card processing equipment, met with merchants' resistance to credit-card sales. A significant number of merchants did not accept credit cards at all, or did not accept credit cards for small purchases, or added a credit-card processing fee to the costs of the purchases. As consumer demand for widespread use of credit cards grew, however, merchants more and more accepted credit-card transactions as a cost of doing business, and even an essential cost of doing business. Adding on a fee for the convenience of using a credit card is an almost extinct merchant practice. The costs of credit-card transactions are now built into the merchants' pricing, as are other costs of doing business.

The efforts and risks involved in the actual collection of funds is borne by the financial institutions that issue the credit cards or any intermediary agencies. The costs of those efforts and risks are offset not only by the charges paid by the merchants but also by the interest paid by consumers on the amounts borrowed, and at times by annual fees paid by consumers.

The real estate rental field, particularly the residential rental field, is burdened with credit-risk issues. A landlord (lessor) is taking on a risk with every tenant. Traditionally rent is paid in monthly installments, with only funds covering one month's rental payment being held as a security deposit against the possibility of a rent-payment default. If a tenant fails to timely pay rent, the landlord's primary recourse is to seek eviction of the tenant, so as to free the premises for rental to a new tenant. Eviction proceedings are generally cumbersome, state law s routinely requiring various pre-eviction notices to the tenant and court hearings, and then reliance on action through the sheriffs office or the like. An eviction proceedings normally is not commenced the day after a rent payment is due, and routinely will take more than one month's time to complete after it is commenced—therefore a one-month's security deposit will not be full compensation to the landlord. Actual collection of the unpaid rent typically requires a separate, additional court proceeding, with its own monetary and time-consumption costs, with no guarantee that any judgment awarded will be collectable. Unlike a typical merchant who exchanges goods or services for on-the-spot payments, a landlord is contracting to exchange the use and possession of his property for a significant time period in exchange for the tenant's promise to make periodic future rent payments.

There are no sufficient means for determining a potential tenant's rental-payment histories. Standard credit checks are an expense many landlords prefer to avoid if possible, and they generally do not reveal rental-payment defaults. Contacting prior landlords is time consuming, and there is no certainty that the person identified by a potential tenant is in fact a prior landlord. Attempting to track a rent-payment history through court records of eviction and collections proceedings is even more burdensome, and the absence of court proceedings in a given jurisdiction is no guarantee that a potential tenant has not walked away from one or more prior tenancies without full rent payment. Moreover, even if a potential tenant does have a perfect rent-payment record, there is no guarantee against such tenant suffering financial problems during the year or so of the lease term.

Individual landlords and small businesses in the rental field are particularly sensitive to these credit-risk issues. A single defaulting tenant can cause serious cash-flow and other financial problems to a landlord who owns just a few rental units. Since such landlords are typically managing the properties single-handedly, or with minimal assistance, they are often poorly situated for handling time-consuming tasks, such as any initial attempts to track rent-payment histories of potential tenants and attempts to evict defaulting tenants and/or to collect unpaid rent.

Many, if not most, rental units in small buildings, for instance buildings holding twenty or fewer rental units, are owned and managed by individual landlords and small businesses. These small landlords typically cannot afford to purchase larger buildings, and large businesses in the rental field often do not find small buildings convenient or profitable to operate. Many renters expect small rental buildings to provide more affordable housing than large developments or high rise buildings, but that expectation is in some degree frustrated by the landlords' needs to maintain sufficient profit margins to cover not only capital and upkeep expenses but also defaults in rent payments. In many instances the actuality is mid-point—the rental units are not as affordable as desired, and are the landlord's profit margins are not as wide as desired.

It is believed that the credit-risk issues are keeping many people out of the small landlord field. They cannot afford the financial risks, and/or they do not have the time to spend tracing rent-payment histories, evictions and/or collections, and/or they question whether the capital investment is justified by the potential profit because rent-payment defaults can destroy profits.

The reluctance of investors and entrepreneurs to enter into the small landlord field in turn depresses the value of small rental buildings. That situation in turn is a factor driving the condominium conversion of many small rental buildings. Even two-flat and three-flat buildings are being converted to condominiums in some cities. The costs of a condominium conversion are often well offset by the higher combined selling prices of the condominium units in comparison the potential selling price of a given building as a small rental building. The The credit-risk issues faced by individual landlords and small businesses also adversely impact tenants. Consenting to a standard credit check by a potential landlord, who is typically a stranger at the time, is a privacy issue to many tenants. Providing personal information such as the identities of prior landlords and prior addresses to a stranger is another privacy issue. Being the respondent in an eviction proceeding or a collection proceeding for many tenants would be at least a serious embarrassment, and the loss of one's residence during a troubled financial period can of course be a devastating experience.

As mentioned above, many renters seek rental units in small buildings with the expectation of affordable housing, or at least more affordable housing than high rise buildings. Their expectations and/or hopes are in some degree frustrated by the landlords' needs to maintain sufficient profit margins to cover not only capital and upkeep expenses but also defaults in rent payments. The costs of defaults by other tenants is to some degree bundled into the rent of all units, and thus tenants who have perfect rent-payment histories are paying for the rent defaults of others.

Tenants who do not have perfect rent-payment histories often will have serious difficulty in renting a decent unit unless by trickery that poor history is concealed. Moreover, no tenant has insurance against the possibility of suffering financial problems during the year or so of the lease duration. Even when the financial problems are temporary and short-lived, the tenant could be facing eviction or other late-payment penalties. In addition, a missed month's rent payment normally must be rectified immediately, for instance by paying what amounts to a double rent payment, which might be difficult for a tenant just recovering from a short-term financial problem.

A tenant who is not in default of rent payments might also be subjected to poor building upkeep and lack of repairs when defaults of others causes financial problems for the landlord. In addition, depressed resale values of small rental buildings will pressure landlords to recoup more of their investment through the rents charged. And condominium conversion of many small rental buildings lessens the number of these types of rental units on the market.

In a competitive market for affordable housing, potential tenants with poor credentials, such as lower-paying jobs, and/or spotty work histories, and/or spotting credit histories, are severely handicapped in competing for rental units of their choice. There is normally no sufficient security that can be given to overcome these reasons why they will be passed over for tenants that appear to be more financially stable. Potential tenants with poor credentials often are unable to obtain suitable housing in the neighborhoods of their choice, which can well be the neighborhoods proximate to the desired jobs.

BRIEF SUMMARY OF THE INVENTION

The present invention is a method of a method for the at least potential payment of rental costs, such as real estate lease costs, comprising of the steps of:

(step a) establishment of a renter's credit card program by F, wherein F is a financial institution or other commercial lending establishment;

(step b) issuance of a renter's credit card under said program to $R_1$, wherein $R_1$ is a party who has rented or seeks to rent X, wherein X is a real estate unit or tangible goods;

(step c) granting rental-transactional authorization under said program to $R_2$, wherein $R_2$ is a party who has rented or seeks to rent X; and (step d) optionally the transferring of a security deposit from $R_1$ to $R_2$ by debit on the renter's credit card; and (step e) optionally transferring of at least one increment of rent payment from $R_1$ to $R_2$ by debit on the renter's credit card.

BRIEF DESCRIPTION OF THE SEVERAL VIEWS OF THE DRAWING

FIG. 1 is a flow diagram of a method of the invention; and

FIG. 2 is a flow diagram of a method of the invention.

DETAILED DESCRIPTION OF THE INVENTION

Referring to FIG. 1, there is shown a flow-chart of a method of periodic real estate rental-cost payment of the present invention, or at least potential payment, designated generally by the reference number 10. The method 10 is comprised of the steps of:

(step 1) establishment of a renter's credit card program by F, wherein F is a financial institution or other commercial lending establishment;

(step 2) issuance of a renter's credit card under said program to T, wherein T is a tenant or a potential tenant;

(step 3) granting lessor-transactional authorization under said program to L, wherein L is a real estate landlord or potential landlord;

(step 4) optionally the transferring of a security deposit from T to L by debit on the renter's credit card; and (step 5) optionally transferring of at least one increment of rent payment from T to L by debit on the renter's credit card.

The renter's credit card program established in accordance with step 1 could be a stand-alone program with credit cards limited to usage to rental payments, or it could be a program bundled together with general credit-card purchasing capabilities. In preferred embodiment, regardless of whether the program is a stand-alone program or bundled together with general credit-card purchasing capabilities, there is at least a portion of credit that cannot be used by the card holder for any purpose other than security deposits and rent payments on their residence or other designated real estate rental payments. To best provide assurance to the landlord that all rent payments will be made timely over the life of a tenancy at the time the tenancy is created, a landlord must be able to obtain credit-approval for the entire transaction, or confirmation that the credit available is sufficient to cover all rent payments for the entire tenancy, and either lock-up that amount of credit, or be reasonably assured that the potential tenant cannot expend that credit for other purposes. -Less assurance would be provided if (a) the credit available is not sufficient to cover all rent payments for the entire tenancy, or (b) if the landlord is unable to lock-up any amount of credit for future rent payments, or (c) if the landlord is unable to assure that the potential tenant cannot expend the credit elsewhere, for instance on other real estate rentals or general rentals. Nonetheless even under these less-assurance circumstances, the credit-risk issues are lessened to the benefit of both L and T.

The credit card issued in step 2 must however be a limited-purpose credit card or have a limited-purpose credit allocation, preferably limited to rental transactions and in particular excluding purchases of goods and services. Most benefits of the present invention would not ensue merely by a landlord becoming authorized to accept general credit cards in rent-payment transactions.

The renter's credit card could be valuable in other rental transactions, for instance for renting vehicles or sports equipment or home-use machinery and the like, because the deposit or other security made is seldom adequate compensation to the rental business if the item is not returned. Again, a rental transaction of any type differs from a outright purchase of goods and services because in purchase transaction the full value is paid (cash or by credit) at the time of the transaction. In the general rental field, the deposit or security would generally be sufficient to cover the cost of the rental transaction if the item is returned timely, but normally would not cover lost rental revenue or the replacement costs if the item is not timely returned or not returned at all. When the item rented is something of less value than a vehicle, although the rental company has not been compensated for an item that is not returned, the value of the items does not generally justify the expense of attempting redress through the court system. A renter's card for general rental transactions would be of benefit to the renter also. It would alleviate the inconvenience and- annoyance of giving a cash security far in excess of the value of the rental transaction. It might also reduce the cost of the rental transaction itself because the late-return and no-return losses of the rental company, which are costs of doing business, are at least decreased if not wholly eliminated. On the other hand, the inclusion of rental transactions beyond real estate rental transactions renders the available credit at risk to be expended for other rental purposes. Nonetheless the present invention in broad embodiment also includes the method for the at least potential payment of rental costs (for the rental of real estate or tangible goods, such as automotive vehicles, sports equipment, home-use machinery and the like) as shown in FIG. 2 comprised of the steps of:

(step a) establishment of a renter's credit card program by F, wherein F is a financial institution or other commercial lending establishment;

(step b) issuance of a renter's credit card under said program to $R_1$, wherein $R_1$ is a party who has rented or seeks to rent X, wherein X is a real estate unit or tangible goods;

(step c) granting rental-transactional authorization under said program to $R_2$, wherein $R_2$ is a party who has rented or seeks to rent X; and (step d) optionally the transferring of a security deposit from $R_1$ to $R_2$ by debit on the renter's credit card; and (step e) optionally transferring of at least one increment of rent payment from $R_1$ to $R_2$ by debit on the renter's credit card.

The general rental transactions and circumstances included in the above method which is shown in FIG. 2 are substantially analogous to real estate rental transactions and circumstances, the difference typically being that in general rental transactions (a) the length of the rental period is typically shorter, (b) the essential value of the item rented is less, and (c) the method for recovery of possession of the item rented is not through eviction proceedings. For simplicity purposes, therefore, the invention will be described and illustrated further below in terms of real estate rental transactions and circumstances, and the descriptions and comments will generally not be repeated for general rental transactions.

The credit card issued in step 2 could be issued to a potential tenant or someone who is already a tenant. In the latter situation, T would be able to pay monthly payments or other incremental rent payments to L when T has a financial need or preference to handle the payment with the renter's credit card, even though T did not possess the card at the time the tenancy was created. In fact, the existence of a credit card program established in step I provides T with a means for avoiding rent-payment defaults and ensuing eviction and/or collections proceedings when unexpected financial difficulties arise during the term of a tenancy. In addition, the existence of a credit card program established in step 1 also alleviates a quandary or dilemma for L when a T contends that a default was due to only a temporary financial problem and requests forbearance. Instead of attempting to surmise the validity of these statements, and instead of choosing between initiating eviction proceedings (which could alienate an otherwise desirable tenant) -or forbearing and thus risking an increase in the lost rent, L can merely request T to obtain a renter's credit card and make the payments from the card to the extent necessary. If T unreasonably refuses to obtain a renter's card, L would probably be justified in both suspecting T's sincerity and acting upon that suspicion.

The granting of landlord-transactional authorization of step 3 might be to an L who is a landlord or only potential landlord. A person at the stage of only considering entering the small landlord field most likely needs to determine the extent of the credit-risks that would be undertaken. A pre-approval of L's status as an authorized landlord would be very advantageous.

The transferring of a security deposit from T to L by debit on the renter's credit card of step 4 and the transferring of one or more increments of rent payment from T to L by debit on the renter's credit card, are optional steps in the embodiment shown in FIG. 1 because they are not essential to the deriving of many of the benefits of the method of the present invention. For the T, the possession of a renter's credit card might well provide insurance against possible future financial difficulties and might well alleviate the handicap of having poor credentials, even if the renter's credit card is never used. For the L, the assurance provided by the possession of the renter's card by one or more tenants is a benefit that again is not dependent on the card ever being used.

Unlike the well known and well entrenched commercial practice of using credit cards for payment of the costs of retail goods and services, the renter's credit card method of the present invention is a restricted, limited use method. While it is expected to be attractive to financial institutions, offering another outlet in the current and highly competitive credit card industry, and attracting new consumers (very possibly without the cost of various incentives), and still being profitable, it would not be an all-purpose credit card. It would provide the instant and mobile credit, but its use would be far more restricted to living essentials than all-purpose credit cards. The efforts and risks involved in the actual collection of funds would still be borne by the financial institutions that issue the credit cards or any intermediary agencies. The costs of those efforts and risks would be offset by the interest paid by T's on the amounts borrowed, and possibly also by annual fees paid by T's and/or transactional fees paid by the L's. Those efforts and risks would be less than general-purpose credits cards, and thus less costly, because the use is limited to very basic living expenditures, and not luxury items that a consumer might not be able to afford. Moreover, the financial institutions would be within their normal lending business, while L's would be out of the lending business. (An L is essentially lending funds to a T at every instance of rent-payment default.)

The maximum amount that can be borrowed on a renter's credit card would normally be set at the time the card is issued. The limited-purpose nature of the renter's credit card does however provide oversight and control over the purpose for which T borrows funds with the use of the renter's card.

The T will have a freedom of borrowing for a very basic living expense, and the freedom from maintaining unnecessary balances in accounts accessible by checks or the like, for instance no-interest checking accounts. A T might well choose to limit credit card debits to the renter's credit card, and forego use of general credit cards for purchases. Under such a system a T would be able to more accurately determine which optional purchases are affordable and which are not.

Any L with an appropriate transactional authorization for a renter's credit card can process security deposits and rent payments by accepting the card. The L is essentially assured of collecting his funds in this credit card transaction if any approval measures are followed. In addition, if the credit card program permits credit to be locked-up or provisionally debited, the L is assured of collecting rent for the entire tenancy or at least a portion thereof. The costs of renter's credit card transactions can built into the rental costs, and as a cost of doing business they are expected to be far less volatile than the costs of eviction and/or collection proceedings.

The judicial system will be less burdened with landlord-tenant cases. Evictions generally are a more drastic relief as to the impact on the tenant than collections, and any reduction in eviction proceedings would be welcome relief to the judicial system. In addition, defaults of renter's card payments can be handled in the same manner as defaults of general credit card payments.

The burden of credit-risk issues will be lessened in real estate rental field, particularly the residential rental field. An L will not be taking on a risk with every tenant. The L's primary recourse in the instance of a rent-payment default will be to debit the renter's credit card, and not to seek eviction of the tenant. Debiting the renter's credit card for hold-overs will be possible, and thus T's would have little to no financial reason for refusal to surrender possession of the rental unit at the end of a tenancy.

A renter's credit card will alleviate the need for determining a potential tenant's rental-payment histories. The expense of standard credit checks is avoided. Time expenditures in contacting prior landlords, and the uncertainty inherent in this method of tracing a T's rent-payment history, is avoided. Moreover, the renter's credit card provides a guarantee against a T suffering financial problems during the year or so of the lease duration.

As discussed above, individual landlords and small businesses in the rental field are particularly sensitive to these credit-risk issues and thus particularly benefit from the method of the present invention. Nonetheless, while a single defaulting T can cause serious cash-flow and other financial problems to an L who owns just a few rental units, a large corporate L can experience cash-flow and other financial problems by virtue of defaulting T's. Even if a large corporate L is not managing the properties single-handedly, or with minimal assistance, as would typical individual or small business L's, they do not benefit from time-consuming tasks, such as any initial attempts to track rent-payment histories of potential tenants and attempts to evict defaulting tenants and/or collect unpaid rent. Thus in broad embodiments, the present invention does not exclude large corporate L's.

The method of the present invention is expected to provide both more affordable housing and higher profit margins. Neither the rent-paying T nor the L is indirectly or directly saddled with the expenses caused by rent defaults.

The method of the present invention will induce or encourage more people to enter the landlord field by diminishing the credit-risk issues. The financial risks become more affordable, and/or the time spend tracing rent-payment histories, evictions and/or collections is significantly reduced, if not eliminated completely. The capital investment is justified by the potential profit because rent-payment defaults are reduced or eliminated, and no longer can destroy profits.

The method of the present invention will increase the value of small rental buildings or any rental building. A greater portion of a L's return on investment can be sought in the resale value of a building, and less needs to be taken from rental payments.

A T will not need to consent to a standard credit check by an L, who is a stranger at the time, nor provide personal information such as the identities of prior landlords and prior addresses, particularly if that T's renter's credit card can guarantee the full rent payments for the entire duration of the tenancy, plus possible damages to the premises. Regardless, having credit to cover only a few increments of rent payments may well be sufficient to avoid being the respondent in an eviction proceeding or a collection proceeding. The loss of one's residence during a troubled financial period is a risk that is substantially eliminated.

T's who do not have perfect rent-payment histories will not have serious difficulty in renting a decent unit, and will not be facing eviction or late-payment penalties. In addition, there will not be any rectification of missed rent payments that could make it financially difficult for a T just recovering from a short-term financial problem.

All tenants will be relieved if possible poor building upkeep and repairs are avoided when defaults of other tenants are eliminated. In addition, as resale values of small rental buildings increase, condominium conversions are expected to decrease, leaving more small rental buildings as rental buildings.

The term rental unit as meant herein includes residential rental units such as an apartment in a multi-apartment building, or a unit that takes up an entire building such as a stand-alone house. The terminology also in broad embodiment includes commercial rental units, such as a shop within a multi-shop building or a shop or factory or the like that takes up an entire building.

By small landlord is meant herein an individual or other entity that owns and leases no more than about 20 or 30 rental units. The terms landlord and lessor are used synonymously herein. The terms renter and tenant are used synonymously herein when the item being rented is a real estate unit.

It is well within the skill of a person in the technical field, upon becoming conversant with, or otherwise having knowledge of, the present invention, to select suitable combinations of program parameters and the like in view of the type of program being designed and/or established.

The above described embodiments are exemplitive, and the terminology is employed for illustration purposes and not limitation purposes. The present invention is not limited to the combinations and subcombinations illustrated herein.

I claim:

1. A method for the at least potential payment of real estate rental costs comprised of the steps of:
   (step 1) establishment of a renter's credit card program by F, wherein F is a financial institution or other commercial lending establishment;
   (step 2) issuance of a renter's credit card with a line of credit under said program to T, wherein T is a tenant or a potential tenant;
   (step 3) pre-reserving at least a portion of said line of credit for payment of renter's obligations;
   (step 4) granting lessor-transactional authorization under said program to L, wherein L is a real estate landlord or potential landlord; and
   (step 5) optionally the transferring of a security deposit from T to L by debit on the renter's credit card; and
   (step 6) optionally transferring of at least one increment of rent payment from T to L by debit on the renter's credit card.

2. The method of claim 1 further including the step of F excluding T's use of credit by debit on said renter's credit card for purposes other than transferring real estate rental security deposits and rent payments.

3. The method of claim 1 further including the step of F excluding use of a predetermined part of credit by debit on said renter's credit card for purposes other than transferring real estate rental security deposits and rent payments.

4. The method of claim 1 further including the step of F providing to L credit-approval for the potential future debit of a plurality of future rent payments on said renter's credit card.

5. The method of claim 1 further including the step of F locking-up credit for the potential future debit of a plurality of future rent payments on said renter's credit card for the benefit of L.

6. A method for the at least potential payment of rental costs comprised of the steps of:
   (step a) establishment of a renter's credit card program by F, wherein F is a financial institution or other commercial lending establishment;
   (step b) issuance of a renter's credit card with a line of credit under said program to $R_1$, wherein $R_1$ is a party who has rented or seeks to rent X, wherein X is a real estate unit or tangible goods;
   (step c) pre-reserving at least a portion of said line of credit for prepayment of renter's obligations;
   (step d) granting rental-transactional authorization under said program to $R_2$, wherein $R_2$ is a party who has rented or seeks to rent X; and
   (step e) optionally the transferring of a security deposit from $R_1$ to $R_2$ by debit on the renter's credit card; and
   (step f) optionally transferring of at least one increment of rent payment from $R_1$ to $R_2$ by debit on the renter's credit card.

7. The method of claim 6 further including the step of F excluding $R_1$'s use of credit by debit on said renter's credit card for purposes other than transferring rental security deposits and rent payments.

8. The method of claim 6 further including the step of F excluding use of a predetermined part of credit by debit on said renter's credit card for purposes other than transferring rental security deposits and rent payments.

9. The method of claim 6 further including the step of F providing to $R_2$ credit-approval for the potential future debit of a plurality of future rent payments on said renter's credit card.

10. The method of claim 6 further including the step of F locking-up credit for the potential future debit of a plurality of future rent payments on said renter's credit card for the benefit of $R_2$.

* * * * *